Jan. 12, 1937. J. E. PADGETT 2,067,283
JOINT MEMBER AND METHOD OF MAKING SAME
Original Filed Aug. 1, 1934

INVENTOR.
JOSEPH E. PADGETT
BY
Lewis, Hudson & Kent
ATTORNEYS.

Patented Jan. 12, 1937

2,067,283

UNITED STATES PATENT OFFICE 2,067,283

JOINT MEMBER AND METHOD OF MAKING SAME

Joseph E. Padgett, Toledo, Ohio

Original application August 1, 1934, Serial No. 737,955. Divided and this application May 4, 1935, Serial No. 19,870

3 Claims. (Cl. 29—148)

This invention relates generally to joint members of an economical form of construction and to novel method of making such members.

This application is a division of my original application Serial Number 737,955, filed August 1, 1934.

An object of this invention is to provide an improved joint member formed of sheet metal, and to a novel method of economically producing such joint members.

Another object of the invention is to provide a yoke, of improved and economical construction suitable for use in a universal joint, such yoke being constructed as a sheet metal member having spaced arms provided with integrally formed bearing supports.

Still another object of the invention is to provide a novel method for the economical production of yokes, and particularly universal joint yokes, wherein portions of a sheet metal yoke blank are formed into hollow supports and wherein the hollow supports are brought into substantial alignment with each other by bending the blank.

Other objects and advantages of the invention will be apparent from the following description when taken in conjunction with the accompanying sheet of drawings, wherein Fig. 1 is an elevational view of a universal joint embodying yokes constructed according to my invention;

In the accompanying drawing to which detailed reference will now be made, I have shown the improved joint members of my invention and have illustrated my novel method of making the same. While my invention is disclosed as relating particularly to members for universal joints, it will be understood of course that my improved joint members may be applied to various other uses and that my novel method may be applied to the economical production of various joint members.

Figure 1:
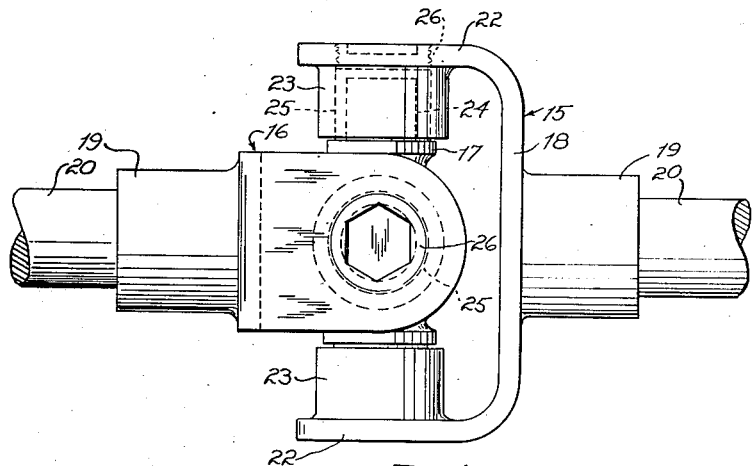

In Fig. 1 of the drawing, I have shown an improved yoke of my invention as being embodied in a universal joint structure which comprises two yokes 15 and 16, and a four-trunnion cross 17 connecting the two yokes. The two yokes are of similar construction each comprising a sheet metal member having a web portion 18 on which is formed a connecting part of appropriate shape, such as the tubular connecting part 19 in which the end of a power transmitting shaft 20 may be splined or otherwise connected.

The sheet metal member comprising the yoke is also provided with arm portions 22 which extend in substantially parallel relation and each of which is provided with an integrally formed hollow pivot support 23. The hollow supports 23 are disposed in substantial axial alignment with each other and one pair of the oppositely extending trunnions 24 of the cross 17 are disposed in these alinged hollow supports. A bearing cup 25 may be mounted in each of the hollow supports 23 to provide a suitable bearing surface or bushing for the trunnions to oscillate in. The bearing cups are inserted into the tubular supports from the outer ends thereof and may be retained in the desired position in the supports by any suitable means, such as the retaining nuts or plugs 26.

The universal joint thus described is very serviceable, and is of very economical construction because each yoke can be formed from a piece of sheet steel by suitable drawing or stamping operations in place of the more expensive casting or forging operations heretofore employed. It is also characteristic of my improved yoke that only a small amount of machining is required and, by the use of suitable dies and drawing apparatus, this improved yoke can be produced rapidly and economically. In forming the yokes as sheet metal parts there is less metal required in the parts than if they were constructed as forgings or castings as heretofore. Another important advantage of the present invention is that it provides a light weight joint construction in which the distribution of metal is such that a desired running balance is obtained even at high speed rotation.

My invention also contemplates a novel method of making joint members from sheet metal, particularly universal joint yokes, and such novel method will now be described.

Figure 2:
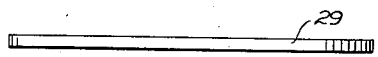
Fig. 2 is an edge view of a blank to be used in forming a yoke according to my invention.
Figure 8:
Fig. 8 is an edge view showing a sheet metal blank to be used in forming a yoke according to another method of my invention.

In Fig. 2 of the drawing I have shown a sheet metal blank 29 which may be sheared or otherwise cut from sheet metal stock of appropriate thickness to provide a blank of the shape or outline necessary to produce the desired yoke.

By means of suitable machinery, such as appropriate drawing dies or the like, the blank of Fig. 2 is subjected to a forming operation during which spaced portions of the blank are drawn out transversely of the plane of the blank to form the hollow supports 30. These hollow supports may be of any suitable size or shape and may be formed by one, or more than one, appropriate drawing step or by any other suitable forming operation.

Figures 6, 12:
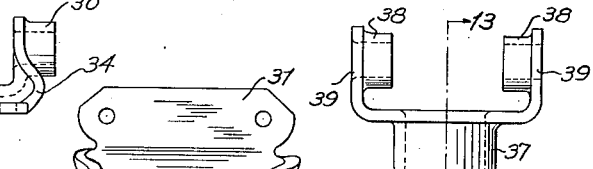
Fig. 6 is a plan view of the yoke shown in Fig. 5.
Fig. 12 is a side view of the yoke formed by the bending of the blank shown in Fig. 10.
Figure 7:
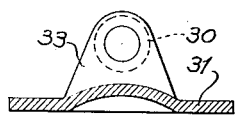
Fig. 7 is a sectional view of the yoke taken on line 7—7 of Fig. 5.
Figures 11, 13:
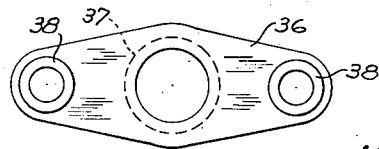
Fig. 11 is a plan view of the partially formed yoke blank of Fig. 10.
Fig. 13 is a sectional view of the blank taken on line 13—13 of Fig. 12.

To provide the yoke blank with an attaching portion which, in the finished yoke, provides a part to which a shaft or other power transmitting member may be connected, I subject the blank to another forming or shaping operation wherein a portion of the blank intermediate the tubular supports 30 is drawn or shaped to form the desired attaching part 31. The attaching part may be a flange having bolt holes therein, as shown in Fig. 6, or may be an attaching part of any other suitable shape.

To form the arms of the yoke and to bring the tubular supports 30 into the relation which they are desired to have in the finished yoke, I bend the blank at appropriate points whereby the portions of the blank on which the tubular supports have been formed become the yoke arms 33 and the tubular supports are, at the same time, brought into substantial alignment with each other. To prevent deflection of the arms 33 with respect to the connecting part 31 while the yoke is in use, it may be desirable to provide the yoke with integrally formed ribs or braces 34 and these braces may be formed at any appropriate stage of the method by drawing or otherwise suitably shaping portions of the blank.

In Figs. 8 to 13, inclusive, I have shown my method carried out in a slightly different manner from what has just been described. In this second method, a sheet metal blank 36 of appropriate size, shape and thickness, is subjected to one or more drawing operations whereby an intermediate portion of the blank is formed into a tubular connecting part 37 which, in the finished yoke, serves to connect the yoke with a power transmitting member, such as the shaft 20 of Fig. 1.

Tubular supports 38 may then be formed on the blank on opposite sides of the connecting part 37. These supports may be formed by any suitable operations and with any appropriate apparatus, and preferably are made of a size and shape to accommodate bearing cups such as the bearing cups 25 of Fig. 1.

To form the yoke arms corresponding with the yoke arms 22 of Fig. 1, I bend the yoke blank 36 at appropriate points whereby the portions of the blank, which carry the hollow supports 38, form the yoke arms 39 and the hollow supports are brought into substantial alignment with each other, as shown in Fig. 12.

Figure 3:
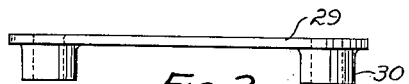
Fig. 3 is a side view of the blank after the hollow supports have been formed thereon.
Figure 9:
Fig. 9 is a view of the blank with an intermediate portion thereof forming an attaching part.
Figure 4:
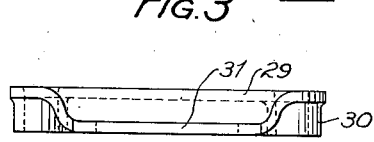
Fig. 4 is a side view of the blank showing an intermediate portion thereof shaped to provide a connecting part.
Figure 10:
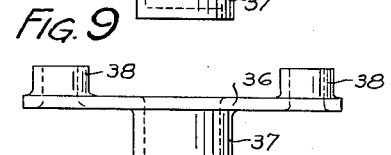
Fig. 10 is a side view of the yoke blank after the tubular supports have been formed thereon.
Figure 5:
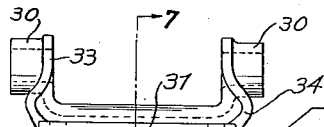
Fig. 5 is a side view of the yoke produced by bending the blank of Fig. 4.

It will be understood, of course, that in carrying out my method the hollow supports may be formed on the yoke blank at the same time, that is during the same operation, that the intermediate connecting part is being drawn or formed on the intermediate portion of the blank. If desired, however, the hollow supports may be formed on the blank before the intermediate connecting part is formed thereon as illustrated in Figs. 3 and 4, or the intermediate connecting part may be formed on the yoke blank before the hollow supports are formed thereon, as illustrated in Figs. 9 and 10.

From the foregoing description and the accompanying drawing it will now be understood that I have provided an improved yoke of economical and practical construction which may be satisfactorily used in a universal joint structure. It will also be understood that I have provided a novel method for the economical production of such yokes from sheet metal blanks.

While I have illustrated and described the improved yoke and method of my invention in a detailed manner, it will be understood of course that I do not wish to be limited to the precise details of construction and steps of procedure herein disclosed, but regard my invention as including such changes and modifications as do not involve a departure from the spirit of the invention and the scope of the appended claims.

Having thus described my invention, I claim:

1. The method of making universal joint yokes which comprises cutting a yoke blank from sheet metal, drawing portions of the blank transversely of the plane thereof to form an intermediate attaching part extending in one direction from the plane of the blank and hollow bearing supports on opposite sides of the attaching part and extending in the opposite direction from the plane of the blank, and bending outer portions of the blank inwardly with respect to the attaching part to bring said bearing supports into substantial alignment with each other.

2. The method of making universal joint yokes which comprises cutting a yoke blank from sheet metal, drawing portions of the blank transversely of the plane thereof to provide a tubular connecting part extending in one direction from the plane of the blank and tubular supporting parts on opposite sides of the connecting part and extending in the opposite direction from the plane of the blank, and bending the blank to bring the tubular supporting parts into substantial alignment with each other.

3. A universal joint yoke comprising a sheet metal member a portion of which forms a generally flat attaching part and other portions of which form a pair of spaced arms, hollow trunnion supports formed integral with said arms and extending in substantial alignment with each other, and bracing means formed as an integral part of said sheet metal member and comprising a rib formed on said attaching part and extending transversely thereof between said arms.

JOSEPH E. PADGETT.